INVENTOR.
RUSSELL E. BAETKE

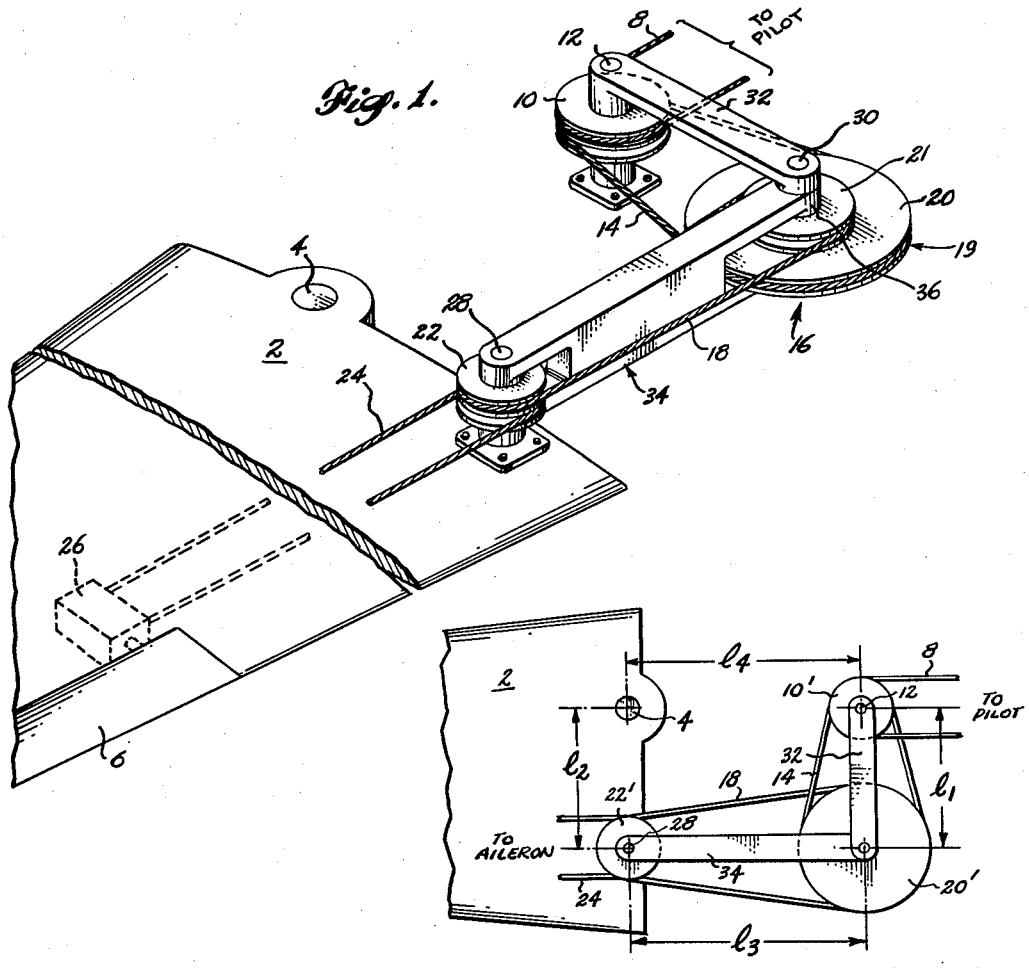
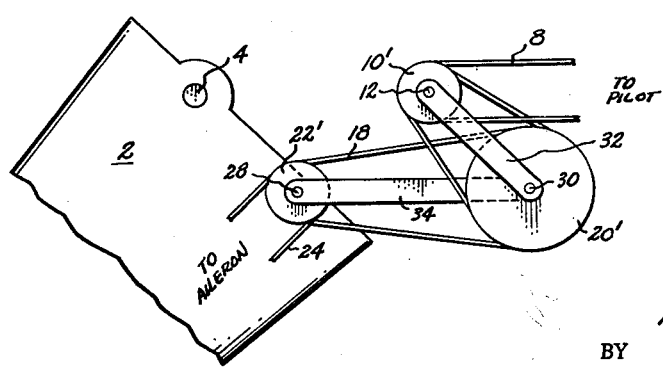

United States Patent Office 3,142,459
Patented July 28, 1964

3,142,459
AILERON CONTROL ON VARIABLE SWEEP
WING DESIGNS
Russell E. Baetke, Seattle, Wash., assignor to The Boeing
Company, Seattle, Wash., a corporation of Delaware
Filed Mar. 7, 1963, Ser. No. 263,632
15 Claims. (Cl. 244—75)

This invention relates to mechanism for actuating or controlling a movable element and in particular to the remote actuation or control of an element which is mounted on a hinged element so as to be movable relative to it.

In such a combination, one is confronted with the problem that each time the hinged element is moved about its hinge, it causes an output deviation in the relative positioning of the movable element. This problem is of particular concern in the aircraft industry in connection with the control of movable surfaces on hinged airfoil components, as for example, in the case of so-called variable sweep wing designs in which the wings are hinged to the aircraft fuselage to enable them to be "folded back" as higher speeds are reached. The control mechanism leading into the wings for ailerons, flaps, spoilers, slats, air brakes and other relatively movable control surfaces thereon, must take the motion of the wings into account or there can be no guarantee that the output position of the control surfaces will conform with the control signal transmitted from the pilot. The present invention was conceived in the face of this problem as it pertains to the aircraft industry, but as will be apparent, the invention has application to many other areas in which a control function is to be transferred to a relatively movable element on a hinged element without the motion of the latter affecting the relationship between the input and output of the former.

In my companion application of August 2, 1962, now also pending with a like title and Serial No. 214,352, I described a control system which enables the control function to be transferred through the hinge axis of the hinged element without the foregoing difficulty. In the present case, I am concerned with situations in which there is no access to the hinge or it is desirable to avoid the hinge for some reason. Accordingly, it is a principal object of the present invention to devise a means and technique which enables a control function to be transferred to a relatively movable element on a hinged element without the motion of the hinged element affecting the relationship between input and output, and which also enables the function to be transferred onto the hinged element at a point apart from the hinge.

A related object is to devise a means and technique by which control can be effected without the movement of the hinged element resulting in rotation of the above point relative to the hinged element. This is to say that in the absence of a control function, the point will turn at the same speed as the hinged element itself and will thereby maintain a constant attitude with respect to the hinge; and conversely, in the presence of a control function, will turn at a speed, relative to the hinged element, which reflects the presence of the control function only so that the relationship between input and output is constant.

These objects are directed in particular to the provision of a mechanism of this type which can be used in the control of ailerons and other relatively movable control surfaces on the hinged wing members of a variable sweep wing design.

It is also an object of the invention in this latter connection to provide a control mechanism of the foregoing type which is susceptible to location at points in the aircraft fuselage that are readily accessible to maintenance workers and that can easily accommodate the mechanism without congestion and/or added structural support.

Another object is to provide a mechanism of this order which requires no additional parts in the critical region of the wing hinges and gives little cause for binding.

Still another object of the invention in its application to variable sweep wing designs is to provide for direct cable bussing between corresponding control surfaces on the right and left-hand wing members to assure coordination of their operation.

Another object calls for the provision of a mechanism of this order which is capable of controlling both wing members from a single point within the aircraft fuselage by a single signal generated at this point and transmitted in equal but opposite form to each of the members.

These and other objects are reached according to the invention by a mechanism of my conception in which the control signal for a relatively movable element on an element hinged on a relatively stationary body, is delivered through a continuous drive system having three rotors that are connected in series with the relatively movable element and arranged on pivots at the vertices of a parallelogram with the hinge of the hinged element. This requires, of course, that two of the rotors be pivoted at opposite vertices of the parallelogram and that the third be pivoted at the vertex opposite that of the hinge. According to the invention, the pivots of the oppositely disposed rotors are fixedly mounted, one on the hinged element and the other on the body. Each therefore has a fixed relationship to the hinge. The rotor whose pivot is fixed apart from the hinged element operates to receive the input signal and for convenience will be referred to as the "input rotor." That which is pivoted on the hinged element operates to transmit the output signal which is delivered to the relatively movable element, and will be referred to as the "output rotor." The third and intermediate rotor in the series operates to translate input into output. Significantly, it rotates on a pivot which is supported in a floating condition at its vertex opposite the hinge. Accordingly, it will be referred to as the "floating rotor" from the nature of the "floating pivot" on which it is mounted.

The term "floating" refers to characteristics which enable the so-called floating pivot to swivel about the input rotor pivot at a radius commensurate with the distance between the vertices occupied by the respective pivots in the parallelogrammic arrangement. According to the invention, the floating pivot is responsive to any pivotal movement of the hinged element about its hinge to undergo such swiveling movement at the same angular speed as the hinged element. This feature enables the floating pivot to "fold" with the hinged element and so to preserve the parallelogrammic arrangement of the pivots and the hinge. When the pitch diameters of the three rotors are properly proportioned in relation to one another, it also enables the floating pivot to introduce a new signal into the drive system, one which is additive to the input and output signals of the system and which has the effect of cancelling the error function that would otherwise arise from the folding movement of the hinged element so that the ratio of input to output remains constant.

It will be appreciated that in any continuous drive system using a chain of rotors, each rotor performs both driven and driving functions. This is to say that each rotor has an incoming signal and an outgoing signal. Since each signal is a variable of pitch diameter, it is possible to vary the relationship between the outgoing signal of one and the incoming signal of the next by varying the relationship between the pitch diameters of their respective signals. Likewise, it is possible to vary the ratio between the incoming and outgoing signals of an individual rotor by providing the rotor with steps having differing pitch diameters, and using one for the incoming signal and another for its outgoing signal. According to my invention, a definite relationship must exist between four of the signals which move among the three aforementioned rotors in my drive system, if the more specific objects of the invention are to be reached. This relationship will be given in terms of the pitch diameters of the signals, in the more detailed description which will follow. For the present, however, it is sufficient to say that the relationship takes into account the outgoing signal of the input rotor, both the incoming and outgoing signals of the floating rotor, and the incoming signal of the output rotor. In its simplest form, the incoming and outgoing signals of the floating rotor may be equated with one another so that, in fact, only three variables are involved within the relationship. The relationship as a whole also has three versions, depending on whether parallel or crossdrive, or a combination of the two, is used among the three rotors.

The term "rotors" is used here to encompass sheaves, pulleys, drums (each of which can be cylindrical, conical, or otherwise), sprockets, gears or other similar means which serve to communicate motion through interconnection with one another by means of a belt, lever, band, chain, teeth, or the like. It is also intended to encompass electrically coactive arrangements such as might be effected with a series of selsyn motors.

The swivel path of the floating pivot may result from the fact that it turns on the input rotor pivot, as for example where it is in cantilever suspension from the latter; or from the fact that it is under the influence of guide means which have the necessary geometrical relationship with the input rotor pivot, as where the floating pivot is slidably engaged in a cam track extending along an arc taken about the input rotor pivot. Other variations of this concept will also appear to one skilled in the art.

The responsive nature of the floating pivot, upon pivotal movement of the hinged element, may flow from the fact that the floating pivot is directly linked with the hinged element, such as through the output rotor pivot, or it may flow from an indirect connection between the respective parts, as for example in the case of an electrically generated reaction. In all events it is only necessary as mentioned that the parallelogram as defined by the vertices of the pivots and the hinge, folds as the hinged element undergoes pivotal movement about the hinge.

In applying my invention as it was originally conceived, to the transmission of a control function for an aileron on a wing member comprising one side of a variable sweep wing design, the pilot's input signal is received in a rotor the pivot of which is fixedly mounted on the aircraft fuselage, and from there the signal is transferred through an intermediate rotor into a third rotor the pivot of which is fixedly mounted on the wing member. This third rotor then delivers the output signal into the aileron. The pivots of the three rotors are arranged at the vertices of a parallelogram with the hinge of the wing member, the intermediate of the three being supported in a floating condition in which it is responsive to movement of the wing member about its hinge to swivel at the same angular speed about the fuselage pivot. The three rotors are also constructed under one of the aforementioned diametrical relationships and are connected in a continuous drive system between the pilot's controls and the aileron.

In its simplest and at present preferred structural form the invention employs cable means in the form of cables or continuous belts to interconnect the rotors in a tandem drive arrangement through the floating rotor. The invention will be better understood with reference to the accompanying drawings wherein this cabled version is illustrated in a variable sweep wing design, there being illustrations of both the parallel and cross drive arrangements.

FIGURE 1 in the drawings is a view in perspective of the general scheme of this version using parallel drive and a stepped floating rotor;

FIGURE 2 is a plan view of a cabled version using parallel drive but a nonstepped floating rotor and showing the wing member in its neutral position;

FIGURE 3 is a similar view of the arrangement of FIGURE 2 after the wing has undergone a 45° rearward sweep;

Figure 4:
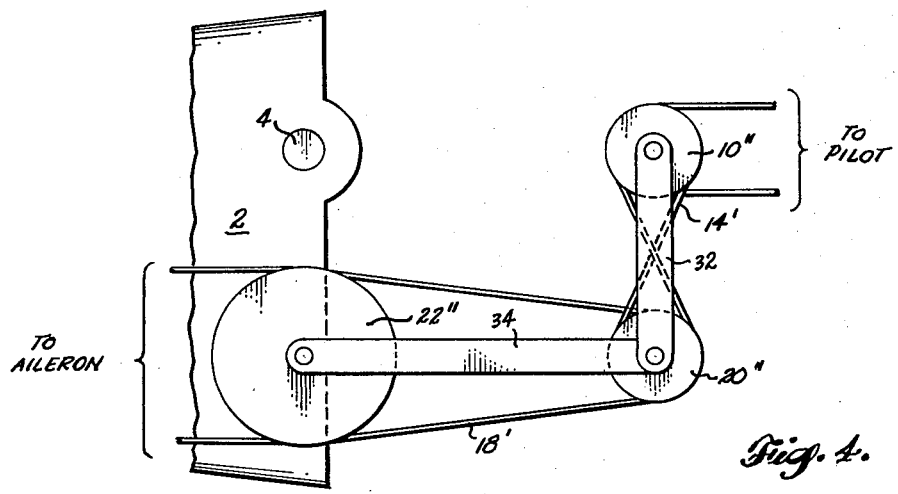
FIGURES 4 and 5 are views similar to that of FIGURE 2 but showing cross drive arrangements in accord with the invention and FIGURE 6 is a view in perspective of an alternative mounting for the floating rotor.

The inboard end of a hinged aircraft wing 2 can be seen on the left-hand side of the schematic illustration of FIGURE 1. To simplify the illustration, part of the wing and the aircraft fuselage to which it is hinged have been omitted. The hinge itself can be seen at 4, however.

According to the invention, adjustment is to be effected in a control surface on the wing 2 from a point apart from the latter within the fuselage. Such a surface is represented by the aileron 6 which is pictured schematically at the left of the view where it is mounted as a relatively movable portion of the wing. The adjustment is made through a belt 8 extending from the pilot's controls (also not shown) about a pulley 10 which is rotatably mounted on a pin 12 bolted to the framework of the fuselage. The rim of the pulley 10 is tandemly grooved to accommodate both the belt 8 and another belt 14 which is part of a drive linkage 16 that serves to pass the input signal from the pilot onto the wing 2. This linkage will be dealt with more fully hereafter, but for the present note that it includes a third belt 18 and a stepped pulley 19 about which the belts 14 and 18 are wound, the belt 14 being lapped about its lower step 20 and the belt 18 about its upper step 21. The other end of the belt 18 is arranged about a third pulley 22, where it is also in tandem with another belt, indicated at 24, and this last leads to the aileron 6 where conventional controls 26 operate to effect the actual adjustment in the aileron. Like the pulley 10, the pulley 22 is rotatably mounted on a fixed pivot, as defined by a pin 28, which in this case, however, is fixed on the wing 2 so as to be movable therewith. Consequently, pivoting of the wing 2 about the hinge 4 will cause the pin 28, and the pulley 22 on it, to swing toward (or away from) the pin 12 and pulley 10. Given a direct belt connection between the two pulleys, it will be appreciated that such motion would have a sizeable effect on the tension in the respective sides of the belt, as well as on the tension in the belt 24 leading to the aileron. In consequence, each movement of the wing would cause a deviation in the output signal reaching the aileron from the pulley 22.

To prevent this, the linkage 16 has been given characteristics which in effect cause a compensatory action to occur at the pulley 22. Firstly, the stepped pulley 19 is mounted so that it continuously rotates at one of the vertices of a parallelogram ($l_1$, $l_2$, $l_3$, $l_4$) with the pulleys 10 and 22 and the wing 2 itself. This is accomplished by mounting the pulley 19 on a wrist pin 30 which is maintained at the lower right-hand vertex (that of $l_1$ and $l_3$) by a pair of cantilever arms 32 and 34 that are articulated with respect to each other about the wrist pin and individually articulated with respect to the fuselage and the wing about the pins 12 and 28, respectively. The effective length of each arm, that is, the distance separating the wrist pin from each of the pins 12 and 28, corresponds with the effective span between the pin mount for the other arm and the hinge 4. Thus, in FIGURE 1, the arm 32 has an effective length $l_1$ equal to the span $l_2$; whereas the arm 34 has an effective length $l_3$ equal to the span $l_4$.

It is apparent from these features that the linkage 16 enables the parallelogram $l_1$, $l_2$, $l_3$, $l_4$ to fold as the wing itself "folds" or pivots into a rearward position. See FIGURE 3. To so fold, however, it is necessary for the belt 14 to turn the pulley 19 clockwise relative to the fuselage or the pulley 10. This turning movement in pulley 19 transmits motion through the belt 18 to the pulley 22 which likewise has a tendency to turn, from the motion of the wing, but in this case relative to the wing and in a counterclockwise direction. Under a proper set of conditions in regard to the pitch diameters of the pulleys 10 and 22 and the steps 20 and 21, the two movements can be made to offset one another so that the pulley 22 will maintain a constant attitude with respect to the wing 2, assuming no signal is under transmission in the system at the time, or will turn only to the extent dictated by any signal which may be in transmission to it at the time.

To establish these conditions, let $\alpha_1$ represent the rotation of pulley 10, $\alpha_{2,3}$ the rotation of steps 20 and 21, and $\alpha_4$ the rotation of pulley 22, about the pins 12, 30 and 28, respectively. Let the symbols $d_1$, $d_2$, $d_3$ and $d_4$ represent the pitch diameters of the pulley 10, the steps 20 and 21 and the pulley 22, respectively. Taking the circumstance in which no control function is being passed from the pilot, and assuming that the wing pivots about the hinge 4 through an angle B, it will be seen that the parallelogram likewise folds through an angle B. Allow the total rotation of a point on steps 20 and 21 to be represented by $\alpha_{2,3a}$ and on pulley 22 by $\alpha_{4a}$. The diameters which will produce an angular rotation $\alpha_{4a}$ equal to B may be found as follows:

$$\alpha_1 d_1 = \alpha_{2,3} d_2$$

since when no control function is passed $$\alpha_1 = B$$

and $$\alpha_{2,3} = B\frac{d_1}{d_2}$$

Since $\alpha_{2,3a}$ represents total rotation of steps 20 and 21

$$\alpha_{2,3a} = B - \alpha_{2,3}$$

$$= B - B\frac{d_1}{d_2}$$

and since $$\alpha_{4a} d_4 = \alpha_{2,3a} d_3$$

$$\alpha_{4a} = \left(B - B\frac{d_1}{d_2}\right)\frac{d_3}{d_4}$$

and if $\alpha_{4a} = B$, as desired, then $$d_2 d_4 = d_3(d_2 - d_1)$$

or $$d_4 = \frac{d_3}{d_2}(d_2 - d_1)$$

This relationship has been applied in general terms to the embodiment of FIGURE 1, although the pulley 22 appears in slightly oversized form for purposes of illustration. When the rotors are accurately proportioned, the system will satisfy the requirement that the pulley rotate in the same angular amount as the wing 2 folds about the hinge 4.

It is also possible that a function may be desired in the aileron as the wing is folded. In this event, a modification of the above relationship can be adopted to suit the particular situation. For this reason, the term "substantially equal" is more apropos in describing the relationship among the pitch diameters of the three pulleys.

It will also be noted that the mechanism as above described is capable of continuous rotation. Thus, when pulley 10 is rotated at constant velocity with respect to the fuselage, pulley 22 will also rotate at a constant velocity with respect to the moving wing 2. There is no error function from the motion of the wing. Parallel cables can be substituted for the belts 14 and 18.

It is apparent that the above relationship can be considerably simplified by substituting a nonstepped rotor 20' for the stepped rotor 19. In this case (FIGURES 2 and 3), the pitch diameters $d_2$ and $d_3$ become equal and the relationship is simply one in which the diameter of one rotor (20') is equal to the combined diameters of the other two rotors (10' and 22'). In the figures, the pulley 20' has, in fact, been given twice the diameter of the pulleys 10' and 22'. The pulleys 10' and 22' need not have the same diameter, of course, so long as the relationship is satisfied. It is, however, preferred to proportion them in this way as a matter of added simplicity of design.

Figure 5:
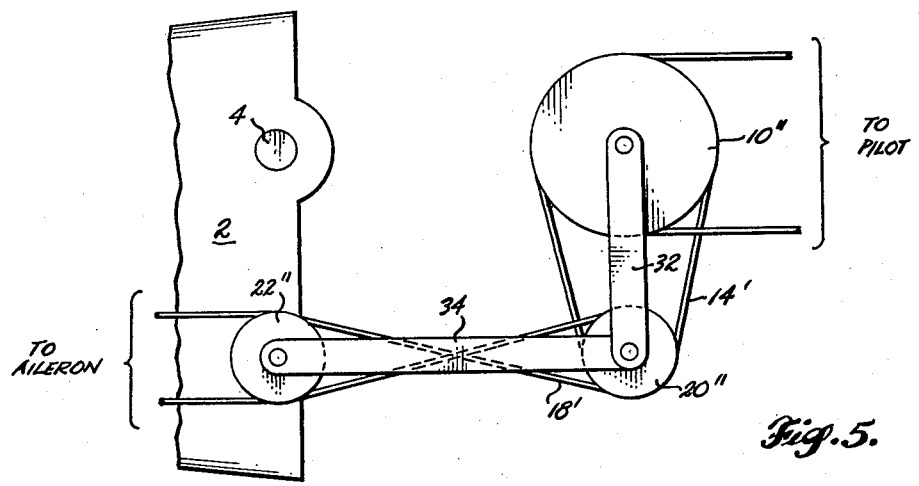

FIGURES 4 and 5 illustrate alternative arrangements in which cables 14' and 18' have been substituted for the belts 14 and 18 of FIGURES 1–3 and cross drive has been installed between the pulley 20' and one of the other pulleys. This rearrangement in the drive requires a modification in the relationship among the diameters of the pulleys, shown in these instances as 10", 20", and 22".

For the arrangement of FIGURE 4 using the symbols $d_1$, $d_2$, and $d_3$ for the pitch diameters of the rotors 10", 20", and 22", respectively; and $\alpha_{2a}$, etc. for their rotation, $$\alpha_{2a} = \frac{B d_1}{d_2} + B$$

$$\alpha_{3a} d_3 = \alpha_{2a} d_2$$

$$\alpha_{3a} = \alpha_{2a}\frac{d_2}{d_3}$$

$$\alpha_{3a} = \frac{d_2}{d_3}\left(\frac{d_1}{d_2} + 1\right)B$$

$$\alpha_{3a} = \left(\frac{d_1}{d_3} + \frac{d_2}{d_3}\right)B$$

or $$\alpha_{3a} = \left(\frac{d_1 + d_2}{d_3}\right)B$$

and again where $\alpha_{3a} = B$, then $d_3 = d_1 + d_2$.

Consequently, the diameter of pulley 22" is twice that of pulleys 10" and 20".

In the arrangement of FIGURE 5, $$\alpha_{2a} = \frac{B d_1}{d_2} + B$$

$$\alpha_{3a} = -\alpha\frac{2 a d_2}{d_3}$$

$$\alpha_{3a} = \left(\frac{(d_1 - d_2)}{d_3}\right)B$$

and where $\alpha_{3a} = B$, $d_3 = d_1 - d_2$.

The diameter of pulley 10" is therefore twice that of pulleys 20" and 22".

As before, the diameters of the smaller pulleys need not be equal so long as the relationship is satisfied.

A fourth version was also investigated in which both sets of cables were crossed. It was not ideally linear but was good for small fold angles or where the arm 34 was long compared with the arm 32.

The illustrated wrist pin mount for the pulley 20 (20' or 20") is only representative of numerous arrangements of which the invention is susceptible, as pointed out earlier. However, to elaborate, it should be mentioned that the arm 34 is slotted at each of its ends to give them a yoke-like configuration having bosses 36 to accommodate the pin 30 and the pin 28. The pin 30 is journaled in the bosses at the outboard end of the arm, while the arm 34 itself is journaled at its inboard end on the pin 28 to assure that the pin 30 will respond to all movement of the pin 28. The arm 32, on the other hand, is in the form of a simple connecting rod with bossed ends which by virtue of their connection with each of the pin 30 and the pin 12, limit the response of the pin 30 to swiveling movement about the latter pin.

Figure 6:
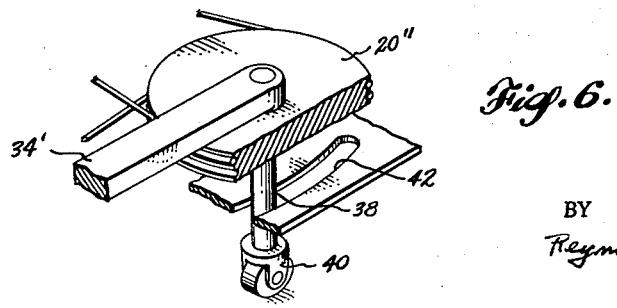

An alternative arrangement is seen in FIGURE 6 where a pintle 38 is supported on a caster or dolly 40 and is slidably engaged in a cam track 42 which follows an arcuate path about the pin 12 (not seen). A simple connecting rod 32' joins the pin 28 with the pintle to cause the latter to move along the cam track when the wing is pivoted.

Although the invention has been described in considerable detail with respect to these preferred embodiments, it is to be understood, of course, that certain modifications and additions can be made in and to them without departing from the spirit and scope of the invention as defined in the claims following.

I claim as my invention:

1. In combination, a relatively stationary body, a hinged element thereon, a relatively movable element on the hinged element, and a continuous drive system for the relatively movable element comprising three rotors connected in series with the relatively movable element and arranged on pivots at the vertices of a parallelogram with the hinge of the hinged element, the pivots of the oppositely disposed rotors being fixedly mounted, one on the hinged element and the other on the body, the pivot of the third of the rotors being supported in a floating condition at its vertex opposite the hinge so as to be capable of swiveling about said other of the fixed pivots at a radius commensurate with the distance between the vertices occupied by the respective pivots in the parallelogrammic arrangement, and being responsive, moreover, to pivotal movement of the hinged element about its hinge to undergo such swiveling movement at the same angular speed as the hinged element.

2. The combination according to claim 1 wherein the pitch diameters of the three rotors are so proportioned in relation to one another as to maintain a constant input-output ratio in the drive system as the hinged element undergoes its pivotal movement.

3. The combination according to claim 2 wherein the third rotor has differing pitch diameters for its incoming and outgoing signals.

4. The combination according to claim 2 wherein the third rotor has a common pitch diameter for its incoming and outgoing signals.

5. The combination according to claim 4 wherein the third rotor has a diameter which is substantially equal to the combined diameters of the other two rotors and the three rotors are connected to turn in a common direction.

6. The combination according to claim 4 wherein one of the oppositely disposed rotors has a diameter substantially equal to the combined diameters of the other two rotors and the three rotors are connected so that said one rotor and said third rotor turn in a direction which is opposite from that of the other rotor.

7. The combination according to claim 1 wherein the rotors are in the form of pulleys interconnected by cable means.

8. The combination according to claim 1 wherein the floating pivot is linked with said other of the fixed pivots to turn thereon.

9. The combination according to claim 8 wherein the floating pivot is linked with said one of the fixed pivots so as to be responsive as mentioned to pivotal movement of the hinged element about its hinge.

10. The combination according to claim 1 wherein the floating pivot is slidably engaged in a cam track extending along an arc taken about said other of the fixed pivots.

11. The combination according to claim 10 wherein the floating pivot is linked with said one of the fixed pivots so as to be responsive as mentioned to pivotal movement of the hinged element about its hinge.

12. In combination, an aircraft fuselage, a hinged airfoil thereon, a relatively movable control surface on the airfoil, and a continuous drive system for the control surface comprising three rotors connected in series with the control surface and arranged on pivots at the vertices of a parallelogram with the hinge of the airfoil, the pivots of the oppositely disposed rotors being fixedly mounted, one on the airfoil and the other on the fuselage, the pivot of the third of the rotors being supported in a floating condition at its vertex opposite the hinge so as to be capable of swiveling about said other of the fixed pivots at a radius commensurate with the distance between the vertices occupied by the respective pivots in the parallelogrammic arrangement, and being responsive, moreover, to pivotal movement of the airfoil about its hinge to undergo such swiveling movement at the same angular speed as the airfoil.

13. The combination according to claim 12 wherein the pitch diameters of the three rotors are so proportioned in relation to one another as to maintain a constant input-output ratio in the drive system as the airfoil undergoes its pivotal movement.

14. The combination according to claim 12 wherein the drive system is used to drive an aileron on a variable sweep wing member.

15. In combination, first and second bodies hinged together on a first axis, a relatively movable member carried by the first body, and movable-member control mechanism interconnecting the bodies and the movable member, including an input rotor mounted on the second body to be rotatable thereon about a second axis parallel to said first axis, an output rotor mounted on the first body to be rotatable thereon about a third axis parallel to said first axis and being operatively connected to the movable member for moving the same by rotation of said output rotor, a floating rotor, means operatively interconnecting the floating rotor with said input and output rotors for transmitting rotation of said input rotor to said output rotor, and an articulated linkage including pivotally interconnected links supporting said floating rotor to permit rotation of said floating rotor about the common axis of said links, said links being connected to the first and second bodies to pivot thereon about said second and third axes, respectively, and, cooperatively with said bodies, defining a parallelogram linkage, with said first, second, third and common axes at the four corners of the parallelogram.

References Cited in the file of this patent
UNITED STATES PATENTS
3,012,443    Ljungstrom    Dec. 12, 1961